United States Patent Office.

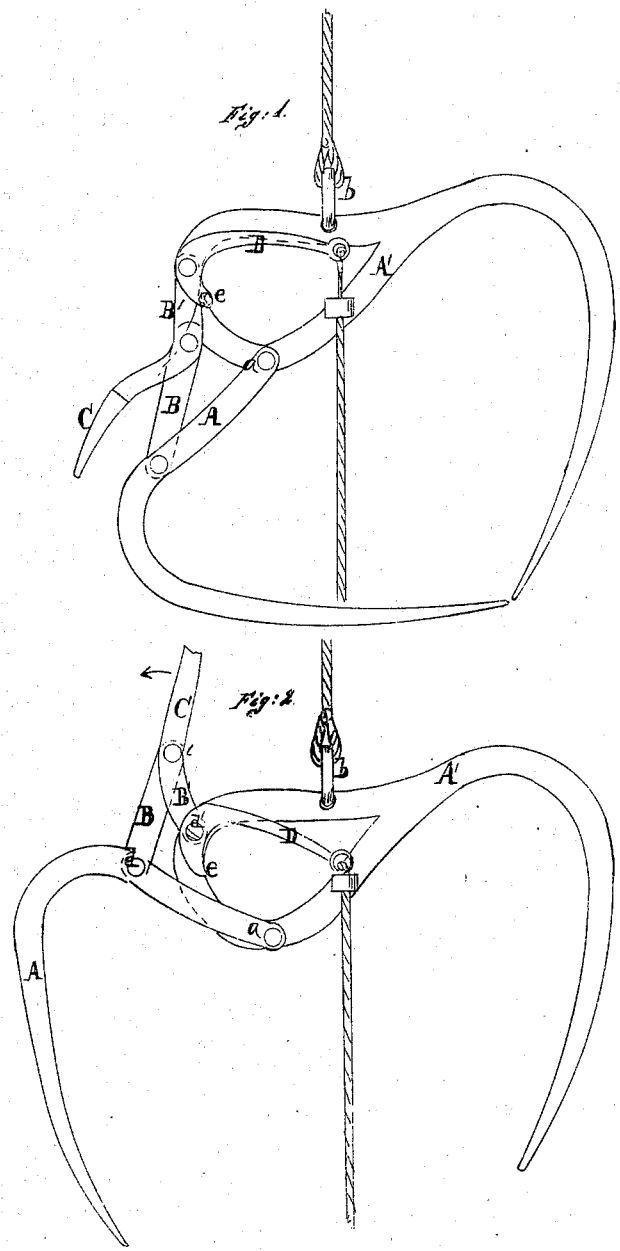

RENSSELAER REYNOLDS AND CHARLES YOUNG, OF STOCKPORT, NEW YORK, ASSIGNORS TO RENSSELAER REYNOLDS, OF SAME PLACE.

IMPROVEMENT IN HORSE HAY-FORKS.

Specification forming part of Letters Patent No. 48,029, dated May 30, 1865.

*To all whom it may concern:*

Be it known that we, RENSSELAER REYNOLDS and CHARLES YOUNG, both of Stockport, in the county of Columbia and State of New York, have invented a new and useful Improvement in Hay-Forks; and we do hereby declare that the following is a full, clear, and exact description thereof, which will enable any person skilled in the art to make and use the same, reference being had to the accompanying drawings, forming part of this specification, in which—

Figure 1 represents a side elevation of our invention when closed and in the condition to be elevated. Fig. 2 is a similar elevation of the same when opened and ready to take in a new load.

Similar letters of reference indicate like parts.

This invention relates to certain improvements in that class of hay-forks which operate with two hinged jaws, in combination with toggle-arms, in such a manner that when the toggle-arms are straightened out the jaws are firmly closed, and a load of hay taken up by them can be hoisted up to any desired height, and by a slight pull on one of the toggle-arms they are thrown out of line and the jaws open to dump the hay.

Our present improvement consists in the application of a trigger, in combination with the toggle-arms and hinged jaws, in such a manner that the operation of throwing said toggle-arms is facilitated, and the load of the fork can be dumped precisely on the desired spot.

It consists, further, in the employment or use of a hand-lever formed by elongating one of the toggle-arms beyond the pivot which connects the same, and extending over the back of one of the jaws in such a manner that by means of said lever a purchase is obtained, whereby the fork is made to enter the hay and to close upon the load with ease and facility.

A A' represent the two jaws of our fork, which are hinged together by a pivot, *a*. A ring, *b*, fastened in the jaw A', serves to take the hoisting-rope; and it will be noticed by referring to Fig. 1 of the drawings that the pivot *a* and ring *b* are not in the center of the fork, so that when the fork has taken in a load the weight of said load itself has a tendency to facilitate the opening and closing of the fork. The two jaws A A' of our fork are also connected by two toggle-arms, B B', which are connected to each other by a pivot, *c*, the arm B being attached to the jaw A by means of a pivot, *d*, and the arm B' to the jaw A' by means of a pivot, *d'*. When the fork is closed and the pivot *c* is thrown within the line drawn through the points *d d'*, the jaws are firmly locked, and they cannot be opened until the pivot *c* is forced out beyond the line down through the pivots *d d'*.

If the fork is locked by the toggle-arms, the weight of the load, pressing on the jaw A, has a tendency to hold the pivot *c* within the line *d d'*; but as soon as said pivot is forced out beyond that line the weight of the load opens the jaw A and the load is dumped.

In order to open the fork and dump the load precisely at the desired spot, we have attached to the pivot *d'* a trigger, D, which forms a double-armed curved lever. The long arm of this lever extends somewhat beyond the ring *b*, which takes the hoisting-rope, and a line or rope attached to it serves to operate the trigger from the ground. The short arm of the trigger is provided with a lip, *e*, which projects under the edge of the toggle-arm B', so that a slight strain on the line attached to the long arm forces the pivot *c* out beyond the line *d d'* and the fork opens.

The arm B' is provided with a hand-lever, C, which extends over the back edge of the jaw A. When the fork is open and in the position ready to take in a new load, as shown in Fig. 2, said hand-lever facilitates the operation of closing the jaws, and by pulling on it in the direction of the arrow marked near it in Fig. 2 the tines of the fork are made to enter the hay and to take up a load.

It must be remarked that we do not claim under this present application the combination of the toggle-arms with hinged jaws. Neither do we claim the manner of connecting and suspending said jaws, as these points have been the subject of a previous application; but

We claim as new and desire to secure by Letters Patent—

1. The trigger D, provided with a lip, $e$, and applied, in combination with the toggle-arms B B' and two hinged gripping-jaws, A A', in the manner and for the purpose herein shown and described.

2. The hand-lever C, attached to the arm B', and applied, in combination with the jaws A A' and toggle-arms B B', in the manner and for the purpose set forth.

RENSSELAER REYNOLDS.
CHARLES YOUNG.

Witnesses:
J. E. KENT, Jr.,
G. B. REYNOLDS.